United States Patent [19]
Watson et al.

[11] Patent Number: 6,129,256
[45] Date of Patent: Oct. 10, 2000

[54] REFLOW FURNACE FOR AN ELECTRONIC ASSEMBLY

[75] Inventors: Jeffrey R. Watson, Phoenix; Kiet M. Van, Chandler; Steven B. Roach, Gilbert, all of Ariz.

[73] Assignee: Intel Corporation, Santa Clara, Calif.

[21] Appl. No.: 09/400,788

[22] Filed: Sep. 21, 1999

[51] Int. Cl.[7] .............................. B23K 37/06; F27B 9/40; F27D 3/12; F27D 5/00

[52] U.S. Cl. ...................... 228/22; 228/180.1; 228/118; 228/214; 228/19; 228/21; 432/4; 432/13; 432/34; 432/50; 432/226; 432/254.1; 219/393; 219/452.12

[58] Field of Search ................... 228/180.1, 118, 228/214, 21, 22, 19; 432/4, 13, 34, 50, 56, 226, 254.1; 219/393, 452.12

[56] References Cited

U.S. PATENT DOCUMENTS

| | | |
|---|---|---|
| 4,533,188 | 8/1985 | Miniet . |
| 5,193,735 | 3/1993 | Knight . |
| 5,338,008 | 8/1994 | Okumo et al. . |
| 5,785,233 | 7/1998 | Nutter et al. . |
| 5,797,539 | 8/1998 | Wilde et al. . |
| 5,891,606 | 4/1999 | Brown . |
| 5,921,462 | 7/1999 | Gordon . |
| 5,934,545 | 8/1999 | Gordon . |

FOREIGN PATENT DOCUMENTS

| | | |
|---|---|---|
| 3542591 | 6/1987 | Germany . |
| 63102392 | 5/1998 | Japan . |

*Primary Examiner*—Patrick Ryan
*Assistant Examiner*—Colleen Cooke
*Attorney, Agent, or Firm*—Blakely, Sokoloff, Taylor & Zafman LLP

[57] ABSTRACT

The invention provides a reflow furnace for an electronic assembly. The electronic assembly comprises a printed circuit board and a device on the printed circuit board. The printed circuit board has solder at a first area near the device and a metallic surface at second area distant from the device. The furnace comprises a frame, a support, a heater, and a shield. The support is secured to the frame and is capable of holding the printed circuit board. The heater is secured to the frame and is capable of heating the printed circuit board while being held by the support. The shield is secured to the frame and is positioned to prevent solder from migrating from the first area to the metallic surface at the second area while the printed circuit board is being heated.

16 Claims, 3 Drawing Sheets

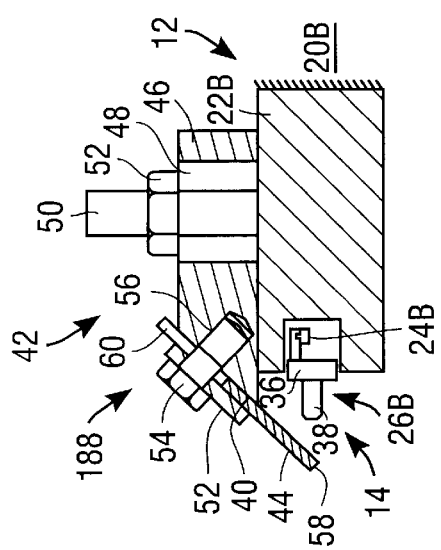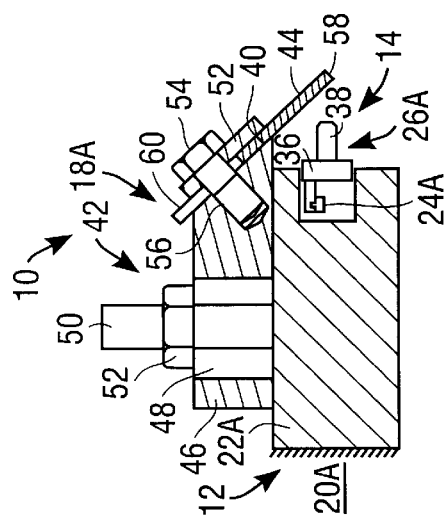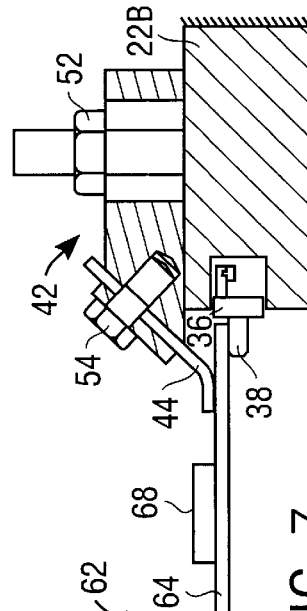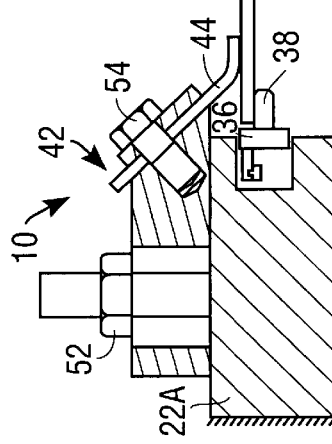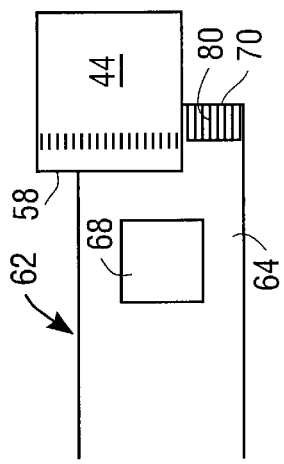

REFLOW FURNACE FOR AN ELECTRONIC ASSEMBLY

BACKGROUND OF THE INVENTION

1). Field of the Invention

This invention relates to a reflow furnace for an electronic assembly and to a method of assembling an electronic assembly.

2). Discussion of Related Art

An electronic assembly such as a motherboard or a card of a computer typically includes a printed circuit board to which one or more devices such as semiconductor packages including processors, memory etc. are mounted. A device is located on the printed circuit board and solder paste is applied to the printed circuit board and a conductive wire, or the like, of the device. The electronic assembly is then heated to cause reflow of the solder. The electronic assembly is then allowed to cool which causes solidification of the solder. The solder thereby provides a mechanical and electrical connection between the device and the printed circuit board.

The printed circuit board may have metallic contacts on one or more edges thereof. When the electronic assembly is heated, the solder starts migrating to the metallic contacts. The solder tends to travel across a surface of the printed circuit board. The printed circuit board may also have hollow vias therein. Tiny solder balls may be located within the vias which blow out of the vias when the electronic assembly is heated. Solder migrating to the metallic contacts can attach to the metallic contacts and so render the electronic assembly defective.

SUMMARY OF THE INVENTION

The invention provides a reflow furnace for an electronic assembly. The electronic assembly comprises a printed circuit board and a device on the printed circuit board. The printed circuit board has solder at a first area near the device and a metallic surface at second area distant from the device. The furnace comprises a frame, a support, a heater, and a shield. The support is secured to the frame and is capable of holding the printed circuit board. The heater is secured to the frame and is capable of heating the printed circuit board while being held by the support. The shield is secured to the frame and is positioned to prevent solder from migrating from the first area to the metallic surface at the second area while the printed circuit board is being heated.

BRIEF DESCRIPTION OF THE DRAWINGS

The invention is further described by way of example with reference to the accompanying drawings wherein:

FIG. 2 is a sectioned end view on 2—2 in FIG. 1;

FIG. 5 is a side view illustrating a portion of a shield of the furnace and a printed circuit board of the electronic assembly, before the printed circuit board contacts a leading edge of the shield;

FIG. 6 is a view similar to FIG. 5 after the printed circuit board contacts the leading edge;

FIG. 7 is a view similar to FIG. 2 further illustrating the electronic assembly;

FIG. 8 is a plan view illustrating a portion of the electronic assembly and a portion of the shield.

DETAILED DESCRIPTION OF THE INVENTION

A Conveyorized reflow furnace for heating an electronic assembly comprising a printed circuit board and a device thereon is described. The furnace includes a frame to which a conveyor and heaters are mounted. The conveyor conveys the electronic assembly past the heaters to cause reflow of solder on the printed circuit board. A shield is also mounted to the frame. The shield is made of a compliant material capable of withstanding high temperatures. A contacting edge of the shield contacts the printed circuit board and prevents migration of the solder to metallized contacts in the form of gold contacts located on an edge of the printed circuit board.

Figure 1:
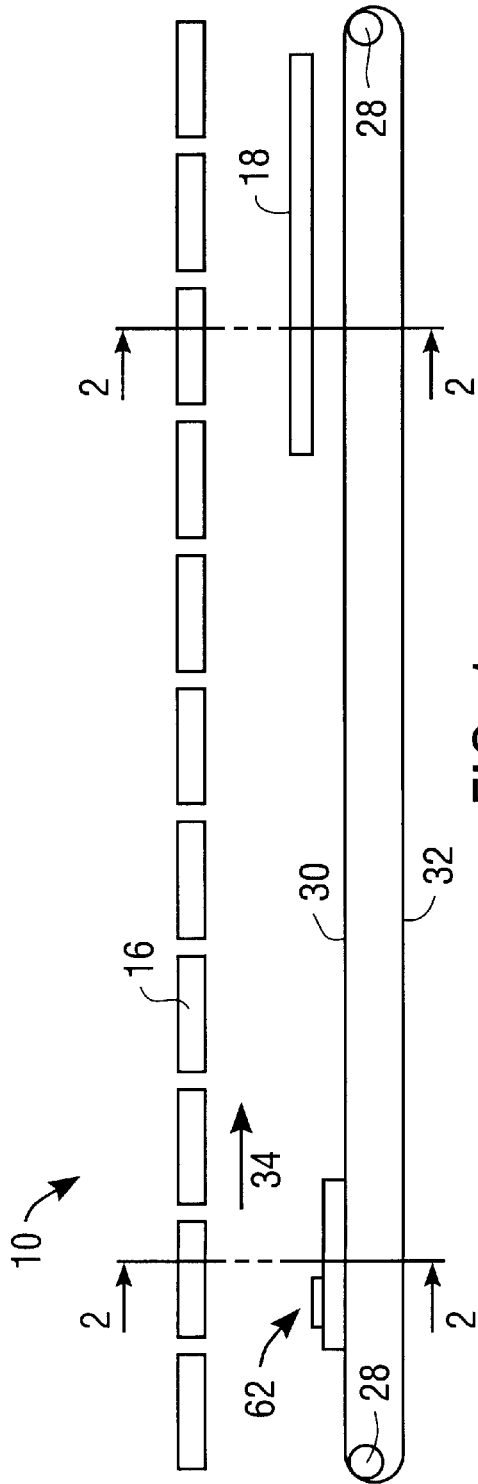
FIG. 1 is a sectioned side view illustrating a conveyorized reflow furnace according to an embodiment of the invention.

FIG. 1 and FIG. 2 illustrate a conveyorized reflow furnace 10 according to an embodiment of the invention. The furnace 10 includes a frame 12, a conveyor 14, a first shielding arrangement 18A, and a second shielding arrangement 18B.

The frame 12 includes first and second vertically extending support structures 20A and 20B, and first and second oven rails 22A and 22B. The support structures 20A and 20B are horizontally spaced from one another. The first oven rail 22A is mounted to the first support structure 20A and the second oven rail 22B is mounted to the second support structure 20B.

The conveyor 14 includes first and second chains 24A and 24B, and first and second sets of pin covers 26A and 26B. Each chain 24 is in the form of a closed loop and runs over gears 28 which are rotatably mounted to the support structure 20A and 20B. The chain 24 thus has an upper section 30 and a lower section 32. When the gears 28 are rotated, the upper section 30 moves in a direction 34 and the lower section 32 returns in a direction opposite to the direction 34. The pin covers 26A are mounted along the length of the first chain 24A and the pin covers 26B are mounted along a length of the second chain 24B. The pin covers 26A and 26B thus move together with the chains 24A and 24B in an orbital path. Each pin cover 26 includes a base portion 36 which is secured to the chain 24, and a pin 38 extending from the base portion 36. The pins 38 are located between the base portions 36 of opposing ones of the pin covers 26A and 26B.

The heaters 16 are located above the first section 30 of the chain 24 and are mounted to the frame 12.

Each shielding arrangement 18 includes a respective bracket 42 secured to a respective one of the oven rails 22, and a respective shield 44 secured to the bracket 42.

The bracket 42 includes a shield plate 46 having a slot 48 formed therein. A threaded mounting shaft 50 is secured to the oven rail 22 and extends upwardly therefrom. The shield plate 46 is located over the shaft 50 so that the shaft 50 extends through the slot 48. A nut 52 is located on the shaft 50 and rotated until a lower surface of the nut 52 contacts an upper surface of the shielding plate 46. The shielding plate 46 can then be adjusted because the slot 48 allows for movement of the shield plate 46 towards and away from the other shielding arrangement. The nut 52 can be tightened to secure the shielding plate 46 in position.

The shield 44 is made of a compliant material such as a silicone rubber material, and should preferably be able to withstand a temperature of at least 230° C. without substantial, more preferably without any permanent deformation, even under conditions wherein the shield 44 is bent. The shield 44 is preferably made of a silicone rubber material as sold by McMaster-Carr of Atlanta, Ga., capable of withstanding a temperature of 260° C. and being about 0.79 millimeters thick. The shield plates 46 have inner surfaces that slant inwardly towards one another in a downwardly direction. Each shield 44 is located against a respective one of the slanted surfaces. A mounting plate 52 is located against the shield 44. A bolt 54 is inserted through a hole in the mounting plate 52 and a slot in the shield 44, is threadably engaged with a threaded hole 56 extending into the shield plate 46, and tightened. The shields 46 are so positioned so that lower portions thereof extend downwardly and inwardly from the brackets 42, each portion having a lower contacting edge 58. The contacting edge 58 is located lower than an upper surface of the pin 38. A slot 60 is formed in an upper portion of the shield 44 which allows for adjustment of the shield 44 in an inclined plane in which the shield 44 is located.

Figure 3:
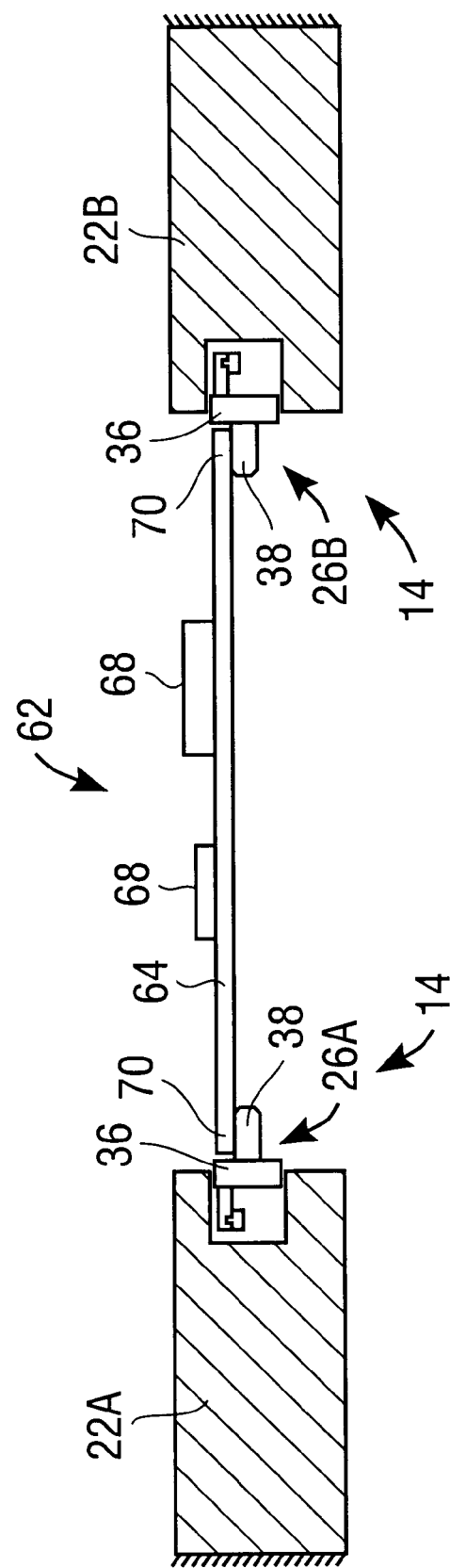
FIG. 3 is a sectioned end view on 3—3 in FIG. 1, further illustrating an electronic assembly.

FIG. 3 is a cross-section on 3—3 in FIG. 1. It shows that, in use, the electronic assembly 62 is located on the conveyor 14 at an entrance of the furnace 10. The electronic assembly 62 includes a printed circuit board 64 and one or more electronic devices 68. The printed circuit board 64 has first and second opposed edges 70. The electronic devices 68 may be semiconductor packages including processors, memory or other dice and are mounted in a central area on top of the printed circuit board 64. Solder (not shown) is typically located on the printed circuit board 64 around the electronic devices for purposes of later connecting the electronic devices 68 electrically and mechanically to the printed circuit board 64. The printed circuit board 64 also typically includes vias (not shown) which are hollow. It may happen from time to time that tiny solder balls are trapped within the vias. Metallic surfaces such as gold contacts may be formed on one or both of the edges 70 of the printed circuit board 64. It is necessary to keep the solder on the central region of the printed circuit board from reaching the contacts on the edges 70 of the printed circuit board 64 when the electronic assembly 62 is heated.

The printed circuit board 64 is positioned so that one of the edges 70 is located on the pins 38 of two or more of the first pin covers 26A and the opposing edge 70 is located on the pins 38 of two or more of the second pin covers 26B. The edges 70 fit snuggly between inner surfaces of the base members 36.

Figure 4:
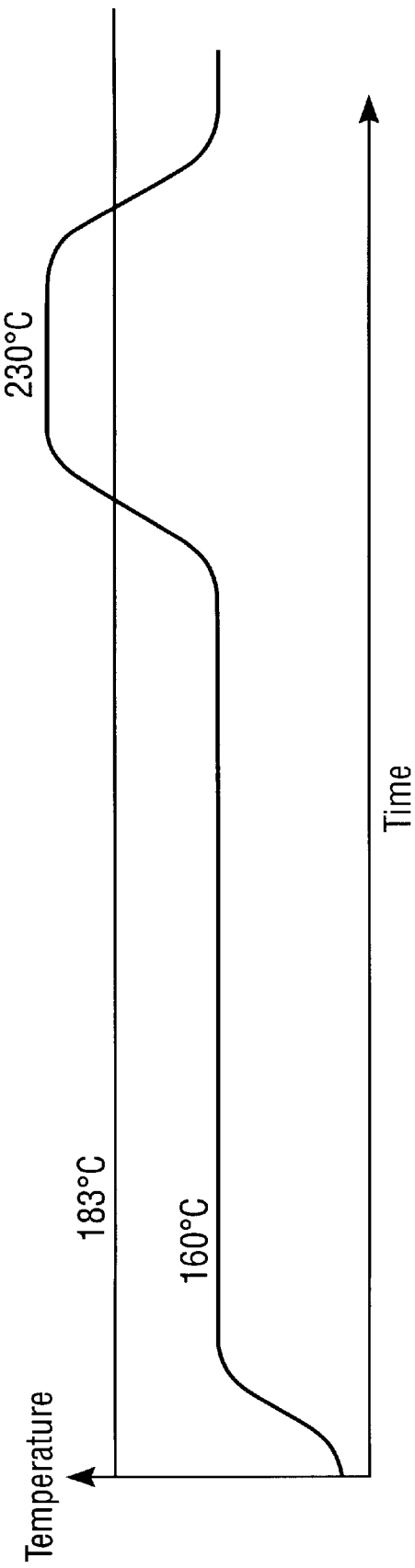
FIG. 4 is a graph illustrating how the electronic assembly is heated by the furnace.

The electronic assembly 62 is then conveyed past the heaters 16. As shown in FIG. 4, the heaters 16 are set to gradually increase the temperature of the electronic assembly 62 to about 160° over a period of about 30 seconds. The electronic assembly 62 is then further conveyed during which time the temperature thereof remains substantially constant for another 210 seconds. The electronic assembly is then gradually heated to a temperature of about 230° C. The solder on the printed circuit board reflows at a temperature of about 183° C. so as to begin softening or melting. The softened solder starts migrating by travel across a surface of the printed circuit board 64 and by blowing out of vias of the printed circuit board 64. The shielding arrangements 18A and 18B are located in a region of the furnace 10 where the temperature is increased above 160° C. to prevent migration of solder to the probe contacts on the edges 70 of the printed circuit board 64.

As shown in FIG. 5, each shield 44 has a curved leading edge 74. Because of the curvature of the edge 74, the printed circuit board 64 engages with the edge 74 which is at angle other than 90° relative to a direction of movement of the printed circuit board 64. Due to the angle of contact of the printed circuit board 64 with the edge 74, and the inclination of the shield 44, the contacting edge 58 of the shield 44 is lifted as shown in FIG. 6. The contacting edge 58 then lies on top of the printed circuit board 64.

FIG. 7 illustrates the electronic assembly 62 when the printed circuit board 64 is moved in underneath the shields 44. The contacting edge 58 of each shield 44 is bent by the printed circuit board 64 in a direction upwardly and away from the bracket 42 to which the respective shield 44 is mounted. The exact location of the contacting edge 58 can be adjusted by adjusting the bracket 42 relative to the oven rail 22 in a direction parallel to a plane of the printed circuit board 64. The width of contact of the shield 44 with the printed circuit board 64 can also be adjusted by adjusting the shield 44 relative to the bracket 42 in a plane of the shield 44 which is at an angle and transverse to the plane of the printed circuit board 64.

FIG. 8 illustrates portions of the electronic assembly 62 and one of the shields 44. The contacting edge 58 of the shield 44 is located between the device 68 and a plurality of contacts 80 on the edge 70 of the printed circuit board 64. The shield 44 shields migrating of solder from an area around the device 68 to the contacts 80. The integrity of the contacts 80 is thus maintained.

Referring again to FIG. 4, the electronic assembly 62 is then further conveyed to a cooler section of the furnace 10 and the temperature drops to below 183° C. so as to cause solidification of the solder and mechanical attachment of the devices 68 to the printed circuit board 67.

While certain exemplary embodiments have been described and shown in the accompanying drawings, it s to be understood that such embodiments are merely illustrative and not restrictive of the current invention, and that this invention is not restricted to the specific constructions and arrangements shown and described since modifications may occur to those ordinarily skilled in the art.

What is claimed:

1. A reflow furnace for an electronic assembly comprising a printed circuit board and a device on the printed circuit board, the printed circuit board having solder at a first area near the device and a metallic surface at a second area distant from the device, the furnace comprising:

a frame;

a support, secured to the frame, capable of holding the printed circuit board;

a heater, secured to the frame, capable of heating the printed circuit board while being held by the support; and a shield secured to the frame, positioned to prevent solder from migrating from the first area to the metallic surface at the second area while the printed circuit board is being heated.

2. A reflow furnace according to claim 1, wherein the shield has a contacting edge positioned to contact the printed circuit board.

3. A reflow furnace according to claim 2, wherein the shield is made of a compliant material which allows the contacting edge to be bent by the printed circuit board.

4. A reflow furnace according to claim 3, wherein the material can withstand a temperature of at least 230° C. without substantial permanent deformation of the shield.

5. A reflow furnace according to claim 1, wherein the positioning of the shield is adjustable relative to the frame so that an edge of the shield is adjustable towards or away from the device.

6. A reflow furnace according to claim 5, further comprising a bracket, secured to the frame, the shield being secured to the bracket and being adjustable relative to the bracket to adjust the positioning of the shield.

7. A reflow furnace according to claim 6, wherein the bracket is adjustable relative to the frame to adjust the positioning of the shield.

8. A reflow furnace according to claim 3, wherein the positioning of the shield is adjustable relative to the frame so that a contacting edge of the shield is adjustable towards or away from the device.

9. A reflow furnace according to claim 8, further comprising a bracket, secured to the frame, the shield being secured to the bracket and being adjustable relative to the bracket to adjust the positioning of the shield.

10. A reflow furnace according to claim 9, wherein the bracket is adjustable relative to the frame to adjust the positioning of the shield.

11. A reflow furnace according to claim 10, wherein the bracket is adjustable towards and away from the device and the shield is adjustable relative to the bracket towards and away from the printed circuit board in a direction transverse to a plane of the printed circuit board.

12. A reflow furnace according to claim 1, wherein the support includes:

a member mounted to the frame for movement in an orbital path, the member being capable of supporting the printed circuit board and movement of the member causing conveyance of the electronic assembly.

13. A reflow furnace according to claim 12, wherein the shield has a contacting edge positioned to contact the printed circuit board, the shield being made of a material which allows the contacting edge to be bent by the printed circuit board.

14. A reflow furnace according to claim 13, wherein the shield has a leading edge which engages with the printed circuit board when the electronic assembly is conveyed towards the shield, the leading edge being at an angle other than 90° relative to a direction of movement of the electronic assembly.

15. A reflow furnace according to claim 14, wherein the shield is in a plane which is at an angle other than 90° relative to a plane of the printed circuit board before the printed circuit board engages therewith.

16. A reflow furnace according to claim 13, wherein the material can withstand a temperature of at least 230° C. without substantial permanent deformation of the shield.

* * * * *